United States Patent [19]
Morey

[11] 4,095,429
[45] Jun. 20, 1978

[54] SOLAR GRAVITY ENGINE

[76] Inventor: Robert E. Morey, 18 Cumberland Rd., Hamilton Square, N.J. 08690

[21] Appl. No.: 794,292

[22] Filed: May 5, 1977

[51] Int. Cl.² .............................................. F03G 7/02
[52] U.S. Cl. ...................................... 60/675; 60/641
[58] Field of Search ...................... 60/675, 641, 531

[56] References Cited

U.S. PATENT DOCUMENTS

| | | | |
|---|---|---|---|
| 196,759 | 11/1877 | Miller | 60/675 |
| 3,932,995 | 1/1976 | Pecar | 60/675 |
| 3,953,971 | 5/1976 | Parker | 60/675 |
| 3,983,704 | 10/1976 | McFarland | 60/675 |

*Primary Examiner*—Allen M. Ostrager
*Attorney, Agent, or Firm*—Albert Sperry; Frederick A. Zoda; John J. Kane

[57] ABSTRACT

A solar or thermal gravity engine including a conduit extending substantially vertically from ground level upward into the atmosphere including a plurality of valves in the walls of the conduit at various heights from the bottom thereof, each valve being capable of opening to allow fluid flow communication between the vertical conduit and a liquid return conduit which extends downward therefrom and may include therein precipitation enhancement means such as grids or fins to allow water vapor or other liquid vapor which has evaporated in the evaporating area to condense in the condensing area when the associated valve is opened and such that the liquid will pass downwardly through the associated liquid return conduit to be gathered as a vertical column of liquid in an accumulating chamber positioned immediately above a liquid driven power generating means such as a turbine or the like, after driving the turbine the downwardly moving liquid may be collected in a return chamber for passage to the evaporation area for repetition of the cycle, a by-pass line may be included to allow passage of fluid directly from the accumulation chamber to the return chamber without passage adjacent the fluid driven turbine, a controller may be included which is responsive to the pressure and temperature of ambient or internal system pressure values or temperature values to control a valve positioned within the by-pass line or to control each valve associated with each liquid return conduit to thereby provide a system for generating energy which does not utilize consumable fuels and does not contaminate the environment.

21 Claims, 2 Drawing Figures

SOLAR GRAVITY ENGINE

BACKGROUND OF THE INVENTION

1. Field of the Invention

The present invention deals with the field of gravity generation systems which are particularly useful since they do not involve the consuming of fossil or other fuels while at the same time do not contaminate the atmosphere and environment with undesirable pollutants. The source of power is gravity, obtained by the adiabatic lapse rate between ground level and upper atmosphere levels which is inherent most particularly in arid environments.

For all practical purposes for the present invention the source of heat at ground level is infinite as well as is the difference in temperature between ground level and upper atmospheric levels. As such the present invention makes use of this functionally infinite heat source at ground level as well as the functionally infinite heat sink at upper atmospheric levels in order to generate usable energy to induce a condensing and evaporating cyclical system which can be used to generate pollution-free electrical or other power outputs.

2. Description of the Prior Art

Many prior art systems which utilize the principle of evaporation at ground level and condensing at upper atmospheric levels are inherently impractical and constructively cumbersome due to the disproportionate size of structure when considered with respect to the energy output thereof. The present design may overcome these previous difficulties due to the inherently closed nature of the general system, most particularly the system shown in FIG. 1 which is entirely closed, that is, hermetically sealed with respect to the external environment. Most prior art systems which utilize this weather effect require very large rain gathering surface areas. This requirement is not apparent in the present system since the entire amount of vapor which evaporates and moves upwardly in the vertically extending conduit is gathered by the predetermined and pre-chosen liquid conduit and, as such, all of the vapor which moves upwardly is able to be gathered and passed through the power generating member.

Also the prior art systems vary in efficiency as the atmospheric conditions would vary, however, the present design includes sensing means for varying the operational characteristics of the closed system in response to the ambient environmental conditions or the internal system environmental conditions. In particular, a control means is provided to vary the vertical height at which the condensed fluid is gathered for passage downwardly to the area of accumulation immediately above the turbine. A control means is included which varies at what height this liquid is condensed responsive to the ambient and internal environmental conditions in order to achieve a height which is optimally equal to the dew point or point of condensation of the vertically moving vapor. In this manner the most efficient means of gathering the precipitating vapor is achieved. These advantages and other advantages over the prior art will become apparent upon study of the operational characteristics of the present system.

SUMMARY OF THE INVENTION

The present invention provides an engine system for utilizing the difference in temperatures and pressures at vertical heights in the atmosphere for generating an evaporating and condensing system for drawing electrical or other power therefrom.

More particularly, the present invention includes a vertically extending conduit which defines therein in the lower region an evaporating area at which point liquid is evaporated to move upwardly through the vertical conduit to the upper region thereof. Adjacent the vertical conduit at each altitude is a condensing area defined within the liquid return conduits. At a point within the condensing area the vapor will precipitate. However a plurality of approximately laterally but somewhat downwardly extending conduits include precipitation enhancement means in order to urge the vapor into the condensing area to precipitate upon the enhancement means. This means may be in the form of horizontally or laterally extending grids or fins within the liquid conduits.

The liquid now condensed within the liquid conduits will move downwardly and be gathered at a lower altitude in an accumulating chamber which is adapted to accumulate therein as a vertically extending column of liquid. This liquid now has stored potential energy due to its height above the original evaporating area. As such, the potential energy of this liquid can be converted into a usable form of energy output by means of a power generator means or fluid driven turbine. After passage adjacent the power generating means the downwardly moving liquid may be gathered in a return chamber for movement to the evaporating area in order to continue the cyclical operation of the present system.

In order to facilitate the control of the amount of fluid driving the fluid driven power generating means a by-pass line may be configured including a valve therein which is operable to allow liquid to by-pass the power generating means and pass directly from the accumulating chamber to the return chamber. In this manner the driving of the power generating means can be closely controlled in order to maintain full cyclical operation of the present system while still withdrawing a usable amount of power therefrom.

In order to assure full and efficient operation of the present system a plurality of sensing means may be utilized in order to sense the external ambient temperature, pressure and/or humidity as well as the temperature and pressure internally within the system. This plurality of sensing means may communicate this sensed information to a valve controller. The valve controller may be operable to open any one of a plurality of valves which are positioned between each liquid conduit and the vertically extending conduit. These valves are normally closed to prevent fluid flow communication between the liquid conduit and the vertical conduit however the controller is operable to open a valve which is positioned at approximately the proper vertical height at which the dew point or point of condensation is presently existing. To determine this altitude and therefore to determine the proper valve to cause to open, the control means senses the ambient and internal environmental conditions and after processing does determine which valve should become open.

This information communicated by the various sensing means is also used by a second controller to open or close the valve located within the by-pass line to control the output of the power generator means and the internal liquid pressure of the "Closed System".

The present system may be entirely closed or hermetically sealed with respect to the ambient environment in order to receive therefrom and be operated by only the temperature difference between the evaporation area and the condensing area. With such a configuration an internal operating fluid as commonly used as a refrigerant in refrigerating systems may be used such as ammonia, Freon, or other suitable substances. Alternatively, the system may be operated in an opened condition in which the return chamber is open with respect to a surrounding environment in order to receive water vapor and water therefrom. With this system the operating fluid within the engine will be water and an additional by-product thereof will be the availability of potable water or irrigation water immediately downstream from the location of the fluid driven turbine. Also when using the opened system the ambient external barometric pressure and humidity must be sensed since these indices now have an important bearing upon the operating characteristics between the evaporating area and the condensing area within the vertically extending conduit. As such the sensing means should be constructed to additionally utilize this information in order to vary the positioning of the valves adjacent the areas of condensation as well as for controlling the valve within the by-pass line.

It is an object of the present invention to generate usable energy without pollution of the external ambient environment.

It is an object of the present invention to generate usable energy without requiring consumption of fossil or other consumable fuels.

It is an object of the present invention to provide a means for generation of energy merely utilizing the difference in temperatures between differing altitudes within the atmosphere.

It is an object of the present invention to provide a system for gathering of condensed fluid in order to provide a source of energy which may readily be tapped for a variety of purposes.

It is an object of the present invention to provide a practical system for harnessing the potential energy stored by the vertical movement of water vapor due to the normal evaporation and condensing cycle.

It is an object of the present invention to provide a means to economically produce potable water from saline and/or chemically contaminated water, without fossil or nuclear energy input.

It is an object of the present invention to provide a source of potable water or irrigation water.

It is an object of the present invention to provide a means of gathering precipitating water vapor which may be varied as to vertical levels in accordance with the constantly varying dew point or point of condensation.

It is an object of the present invention to provide a system for the storage of kinetic energy by the holding of liquid within a chamber at a height well above ground level.

It is an object of the present invention to sense ambient external environmental characteristics and to compute the height of the dew point at any particular chosen time and to cause precipitation of water vapor or other vapor at approximately that vertical altitude.

It is an object of the present invention to take advantage of the adiabatic lapse rate of the atmosphere in order to harness usable energy.

It is an object of the present invention to enhance precipitation of vapor at a substantial vertical altitude and to gather the liquid so precipitated to provide a usable source of energy.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
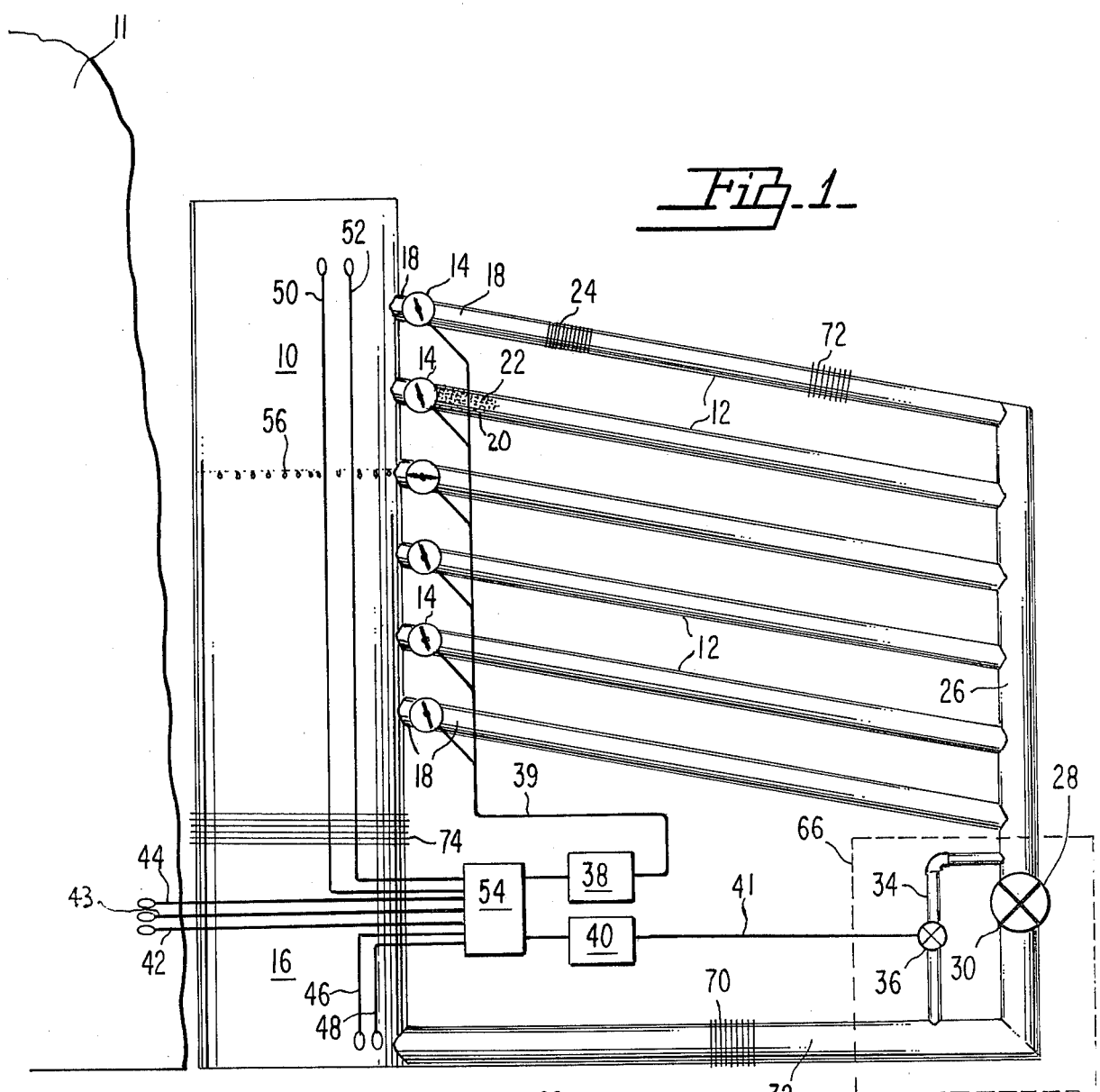
FIG. 1 is a schematic representation of an embodiment of the present invention in which the internal environment is hermetically sealed with respect to the ambient environment.

FIG. 1 illustrates an embodiment of the thermal gravity engine of the present invention. A conduit 10 is shown extending from an approximately ground level vertically upward to a higher altitude. The conduit 10 defines a chamber therein where a lower region at approximately ground level comprises an evaporating area 16. The upper level of the vertical conduit communicates with a plurality of liquid return conduits 12, each of which defines a condensing area 18. The conduit 10 should be of sufficient height to establish a substantial difference between the external ambient temperature at the evaporator area 16 from the external temperature adjacent of the condensing area 18. Generally speaking the vertical conduit 10 should extend as high as structurally feasible. In order to facilitate support of such a vertical construction it may be deemed advisable to construct this conduit immediately adjacent to some other vertically extending element such as a mountain 11. It may indeed be feasible to place the conduit 10 adjacent to a mountain such that the conduit extends downwardly into the valley therebelow and thereby minimize the strengthening structures required in the overall construction.

A plurality of liquid return conduits 12 will be positioned for fluid flow communication with the upper region of conduit 10 at various vertical altitudes therein. The liquid return conduits will be affixed to the wall of the conduit 10 at a different vertical altitude in order to allow for varying heights of the point of condensation responsive to environmental conditions. In the normal operation of the system only the single or multiple liquid return conduits 12 at the same height will be utilized and all the non-operating conduits 12 which are at other altitudes will be closed. Valve means 14 within each of the conduits 12 will be normally closed and will be opened when actuated to allow condensing in the internal environment of the liquid conduit 12.

In order to facilitate condensing of vapor within the liquid return conduits 12 a precipitation enhancement means 20 such as grid means 22 or fin means 24 may be located therein. More particularly the grid means may be in the form of a wire mesh or the like extending across and throughout the interior of the return conduit 12 in order to provide a location for the vapor to precipitate. Alternatively a plurality of fins 24 may be positioned annularly around the internal radius of the conduit 12 to operate similarly while still allowing fluid flow through the conduit 14.

The liquid return conduits 12 each are positioned to extend transversely with respect to the vertical conduit 10 however they should include a slight downwardly extending angle in order to urge the liquid precipitated therein to be gathered by the conduit 12 and be moved downwardly therein by gravitational force. Each of the liquid return conduits 12 is positioned to allow the liquid moving downward therein to be gathered within an accumulating chamber 26, which is adapted to hold a standing column of liquid to provide the source of energy of the present system. This accumulating chamber 26 should be positioned immediately above a power generating means 28 such as a fluid driven turbine 30 for the generation of a quantity of electrical or other power. After the fluid has passed the location of the turbine 30 it may fall further downwardly and be accumulated within a return chamber 32. The return chamber 32 is connected for direct fluid flow communication to the evaporation area 16 of the vertical conduit 10 to thereby continue the cylical operation of the present system. Under certain operating conditions it will be desirable to allow some of the liquid accumulated within the accumulating chamber 26 to pass directly to the return chamber 32 without passing through the fluid driven turbine 30. In order to achieve this purpose a by-pass line 34 will be positioned between the accumulating chamber 26 and the return chamber 32. To control the amount of liquid flow through the by-pass line 34 a by-pass valve 36 may be positioned therein and may be controlled by a control means such as by-pass valve control means 40 responsive to various system operating conditions.

A valve control means 38 which may be mechanical or preferably electronic may be connected to each of the valves 14 by control lines 39. A sensor 54 gathers information from a plurality of sensing means and communicates this information to the valve control means 38 in order to allow this control means to make a decision as to which liquid return conduit 12 should be utilized for precipitation and gathering of the condensing liquid. The sensor 54 receives information from ambient pressure sensing means 42, ambient humidity sensing means 43, ambient temperature sensing means 44, evaporating area pressure sensing means 46, evaporating area temperature sensing means 48, condensing area pressure sensing means 50 and condensing area temperature sensing means 52. Each of these inputs is communicated by the sensor 54 to the valve control means 38. The valve control means 38 (such as a microprocessor) may now determine the altitude of the dew point or the point of condensation with the condensing area 18. Consequently the valve control means 38 will select the valve means 14 associated with that liquid return conduit 12 which is closest to this vertical altitude. In this manner, the condensing of vapor within the condensing area 18 will be facilitated by exposing the precipitation enhancement means 20 to the vapor at the approximate vertical altitude of the dew point. In this manner an efficient means of gathering the condensing liquid wll be achieved being responsive to external ambient conditions and internal system environmental conditions. It should be appreciated that the point of condensation or dew point 56 will continuously vary as the environmental conditions themselves vary and as such the opening and closing of various valves will be a continually operating condition. The sensor 54 will also provide the same information to the by-pass valve control means 40 in order to allow that control means to make a decision as to the position of the valve 36. The modulation of valve 36 will be controlled by the by-pass valve control means 40 via the control line 41.

The configurations shown in FIG. 1 is referred to as the "closed system". Within this closed system the main source of energy will be the difference in temperature in the ambient environment immediately adjacent the evaporation area 16 in comparison with the temperature of the ambient environment immediately adjacent the condensing area 18. Since the system is hermetically sealed with respect to the ambient environment the barometric pressure and humidity of the external environment should not be factors in determining the altitude of the dew point 56. Therefore this closed system will tend to be utilized in geographic locations in which the difference in temperature between ground level and a given vertical height is greatest. Under such systems the internal environmental pressure will be sensed by the pressure sensing means 46 and 50 in order to further provide information to the by-pass control means 40 for modulating flow through the by-pass valve 36. Also the closed system is superior for operation in areas where the temperature goes below 32° F since the refrigerant is fully operable within normal atmospheric temperatures whereas other systems which utilize water are obviously inoperable below the freezing point of water. The closed system will be best utilized when operating with Freon or ammonia or an operating fluid.

Figure 2:
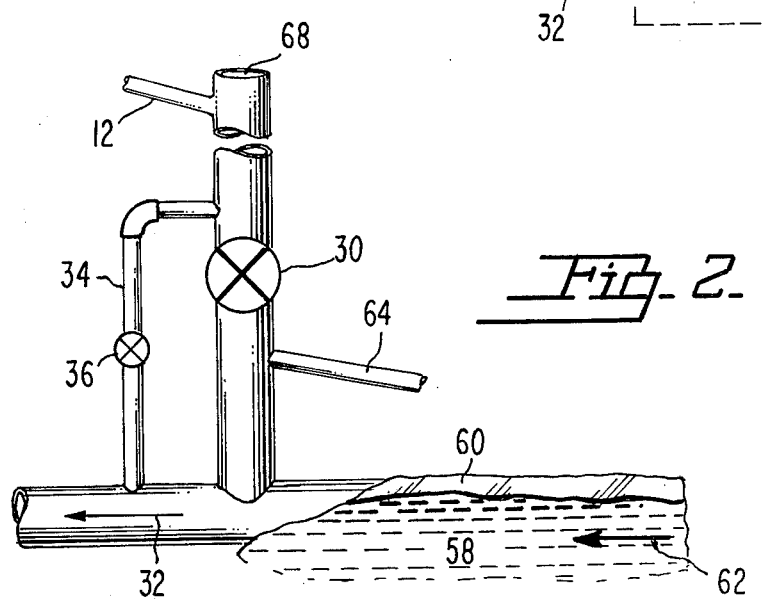
FIG. 2 is an alternative schematic embodiment of the configuration shown in FIG. 1 wherein the internal environment of the system is in fluid flow communication with the external ambient environment.

FIG. 2 is an illustration of an alternative configuration of the portion of the closed system circled in dotted-out line 66. The system shown in FIG. 2 may be defined as the "opened system" since the return chamber 32 is in full fluid flow communication with the external ambient environment. Preferably the return chamber 32 will be in close communication with the upper surface of a natural or artificial lake 58 or other such body of water in order to receive saturated water vapor therefrom. To aid in the gathering of heat in this area a transparent cover 60 may extend outward from the return chamber 32 over a portion of the water source 58. This cover 60 may be transparent to enhance the greenhouse affect and therefore increase the input of water vapor into the evaporating area 16 via passage through the return chamber 32. To aid in the upward movement of water vapor in vertical conduit means 10 the accumulating chamber means 26 may be configured to include a vent means such as vent 68 in the upper area thereof to vent the upwardly carried air. Also the present system should be directionally oriented such as to take advantage of any prevailing winds as shown by arrow 62 which would induce the flow of vapor into the return chamber 32.

With the opened system, obviously, the input operating fluid can be saline or polluted water. With such configurations an additional advantage can be achieved by the positioning of a water drain 64 immediately below the water driven turbine 30. This water drain 64 would provide the source of potable water or pure water for other purposes such as irrigation or the like. The heated vapor will accumulate in evaporation area 16 and will move upwardly through the conduit 10 to the condensing area 18. The valve control means 38 will be responsive to the internal as well as external environmental conditions in order to determine the dew point 56 within the conduit 10. The corresponding valve means 14 will be opened to facilitate the precipitation of the water within the appropriate return conduit or conduits 12. This condensation induced by the precipitation enhancement means 20 will decrease the pressure in the condensing area 18 slightly and will provide a slight updraft moving from the evaporating area 16 to the condensing area 18 which will further enhance the vaporizing of liquid in the evaporating area 16. It of course should be appreciated that this system would not function well within an environment which very often includes temperature variations below the freezing temperature of water. However in the warmer arid temperatures the open system has many advantages since rapid evaporation of water is common.

To facilitate the transfer of heat the cover 60 may be transparent, also the walls of the enclosed vertical conduit 10 may be transparent to enhance thermal flow between the external ambient environment and the interior of conduit 10. While the size of the vertical conduit 10 is anticipated to be as large as physically feasible it should be appreciated that it would be virtually impossible to provide any appreciable decrease in the ground level temperature or any appreciable increase in the upper altitude temperature due to the evaporating condensing cycle within the present thermal gravity engine. As such the present invention makes use of this infinite source of heat at evaporation level and the infinite heat sink at higher altitudes to provide a continuing source of usable electrical or other energy.

It should be appreciated that the configuration shown in FIG. 1 is merely a preferred embodiment of the general present invention. In particular the vertical conduit means 10 may include a plurality of vertically extending conduits. More particularly the liquid return conduit 12 at a given location may comprise a plurality of liquid return conduits 12 extending outwardly radially from a central vertical conduit means and in that way provide a plurality of areas for condensing of the upwardly moving vapor. With this configuration the openings in the wall of the vertical conduit at a given height would connect to a plurality of liquid return conduits 12 which extend radially outward from this central location. Each of these conduits 12 would include therein a valve means 14 as well as precipitation enhancement means 20. Also the liquid return chamber 32 could comprise a plurality of conduits extending similarly radially outward from the evaporation area 16 of the vertically extending conduit 10. In this manner the amount of heat transfer between the external ambient environment and the multiple conduit 32 would be increased. Similarly when using multiple liquid return conduits 12 at a single given height and when utilizing multiple vertically extending conduits 10 the amount of heat transfer between the external ambient environment and the internal environment is increased and the operating volume of the entire apparatus is similarly increased.

The power generating means 28 could also be formed as a multiplicity of individual power generating stations all placed in series immediately downstream from the accumulating chamber means 26. In this manner the total amount of internal pressure created by the vertically standing column could be gradually reduced at each station in order to eliminate the entire amount of downwardly extending pressure being exerted solely against a single power generating means.

In order to enhance the transfer of heat between the external ambient environment and the internal environment of the system the vertically extending conduit may be configured with a plurality of external fins or other thermal flow enhancement means 74. The liquid return conduit means and the liquid return chamber means may also be configured with similar thermal flow enhancement means 72 and 70, respectively. In this manner the differences in temperature which the present system utilizes as a means of generating energy will be more effectively communicated to the interior of the system from the ambient environment.

While particular embodiments of this invention have been shown in the drawings and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A solar gravity engine comprising:
   (a) a substantially vertical conduit means including an evaporating area in a lower region thereof;
   (b) a plurality of liquid return conduit means each being attached at different vertical locations to said vertical conduit for selective condensation and fluid flow therewith, each of said liquid return conduit means defining a condensing area therein in the region adjacent said vertical conduit means;
   (c) a plurality of first valve means each one positioned in the fluid flow path between said vertical conduit means and one of said return conduit means to selectively control fluid flow from said vertical conduit means to the associated return conduit means;
   (d) an accumulating chamber means being in fluid flow communication with the output of said return conduit means to receive and accumulate condensed fluid therefrom;
   (e) a return chamber means connected for fluid flow communication between said accumulating chamber means and said evaporating area to allow liquid to return from said accumulating chamber means to said vertical conduit means;
   (f) power generating means positioned adjacent the fluid flow path from said accumulating chamber means to said return chamber means and adapted to be activated by liquid movement therealong to produce usable energy;
   (g) a by-pass line connected between said accumulating chamber means and said return chamber to allow a controlled amount of condensed liquid to flow from said accumulating chamber means to said return chamber means without passing adjacent said power generating means;
   (h) a second valve means positioned within said by-pass line to modulate flow therethrough;
   (i) first control means to modulate fluid flow through each of said first valve means; and
   (j) second control means to modulate flow through said second valve means.

2. The engine as defined in claim 1 further comprising ambient sensing means for sensing ambient external environmental conditions and communicating the sensed information to said first control means and said second control means.

3. The engine as defined in claim 1 further comprising system sensing means for sensing environmental conditions within the internal system of the thermal gravity engine and communicating the sensed information to said first control means and said second control means.

4. The engine as defined in claim 3 wherein said system sensing means includes a temperature sensing means.

5. The engine as defined in claim 3 wherein said system sensing means includes a pressure sensing means.

6. The engine as defined in claim 1 including precipitation enhancement means located within said return conduits means and said condensing area to facilitate and enhance condensation of vapor therein.

7. The engine as defined in claim 6 wherein said precipitation enhancement means includes grid means within the fluid flow path of each of said liquid return conduit means.

8. The engine as defined in claim 6 wherein said precipitation enhancement means includes interior fin means within the fluid flow path of each of said liquid return conduit means.

9. The engine as defined in claim 1 wherein said power generating means is a fluid-driven turbine.

10. The engine as defined in claim 1 wherein said first control means and said second control means are electronic.

11. The engine as defined in claim 1 wherein said vertical conduit means is formed of thermally conductive material to facilitate heat transfer between the interior of said vertical conduit means and said return chamber means with the ambient external environment.

12. The engine as defined in claim 1 wherein the cyclical fluid flow path from said vertical conduit means to said return conduit means to said accumulating chamber means to said return chamber means and said by-pass line is hermetically sealed from the external ambient environment.

13. The engine as defined in claim 12 further including freon as the liquid and vapor fluid passing cyclically through the system.

14. The engine as defined in claim 12 further including ammonia as the liquid and vapor fluid passing cyclically through the system.

15. The engine as defined in claim 1 wherein said accumulating chamber means includes a vent means to the ambient in the upper area thereof.

16. The engine as defined in claim 1 wherein said return chamber means is open with respect to the surrounding environment to receive water and water vapor therefrom for passage to said evaporation area.

17. The engine as defined in claim 16 further comprising a water drain positioned adjacent said power generation means to receive potable condensed water from said accumulating chamber.

18. The engine as defined in claim 1 further including thermal flow enhancement means on the exterior of said vertical conduit means, said liquid return conduit means and said return chamber means.

19. The engine as defined in claim 1 wherein said power generating means comprises a plurality of power generating stations placed in series within the liquid flow path from said accumulating chamber means to said return chamber means.

20. A thermal gravity engine comprising:
 (a) a substantially vertical conduit means including transparent walls and further including an evaporation area in a lower region thereof;
 (b) a plurality of liquid return conduit means each being attached at different vertical locations to said vertical conduit for selective fluid flow therewith, said liquid return conduit means defining a condensing area in the region thereof adjacent said vertical conduit means;
 (c) precipitation enhancement means within said liquid return conduit means to facilitate condensing of vapor thereon;
 (d) a plurality of first valve means each one positioned in the fluid flow path between said vertical conduit means and one of said liquid return conduit means to control fluid flow from said vertical conduit means to the associated return conduit means;
 (e) an accumulating chamber means being in fluid flow communication with the output of said liquid return conduit means to receive and accumulate condensed fluid therefrom;
 (f) a return chamber means connected for fluid flow communication between said accumulating chamber means and said evaporation area of said vertical conduit means to allow liquid to return from said accumulating chamber means to said vertical conduit means and provide a closed system sealed hermetically with respect to the ambient environment;
 (g) fluid-driven turbine means positioned adjacent the fluid flow path from said accumulating chamber means to said return chamber means and adapted to be activated by liquid movement therealong to produce usable energy;
 (h) a by-pass line connected between said accumulating chamber means and said return chamber means to allow a controlled amount of condensed liquid to flow from said accumulating chamber means to said return chamber means without passing adjacent said fluid-driven turbine means;
 (i) a second valve means positioned within said by-pass line to modulate flow therethrough;
 (j) a first control means to modulate fluid flow through each of said first valve means;
 (k) second control means to modulate flow through said second valve means; and
 (l) system temperature sensing means and system pressure sensing means for sensing environmental conditions within the internal system of the thermal gravity engine and communicating said information to said first control means and said second control means.

21. A thermal gravity engine comprising:
 (a) a substantially vertical conduit means including transparent walls and further including an evaporating area in a lower region thereof;
 (b) a plurality of water return conduits each being attached at different vertical locations to said vertical conduit for selective fluid flow therewith, said water return conduits defining a condensing area therein in the region adjacent said vertical conduit means;
 (c) precipitation enhancement means to facilitate condensing of water vapor therein;
 (d) a plurality of first valve means each one positioned in the fluid flow path between said vertical conduit means and one of said return conduit means to control fluid flow from said vertical conduit means to the associated return conduit means;
 (e) an accumulating chamber means being in fluid flow communication with the output of said return conduit means to receive and accumulate water therefrom, said accumulating chamber means including a vent means in the upper area thereof to the ambient environment;

(f) a return chamber means for fluid flow communication between said accumulating chamber means and said evaporating area of said vertical conduit to allow water to return from said accumulating chamber means to said vertical conduit means, said return chamber means being open with respect to the surrounding environment to receive water and water vapor therefrom for passage to said vertical conduit means;

(g) fluid-driven turbine means positioned adjacent the fluid flow path from said accumulating chamber means to said return chamber means and adapted to be activated by water movement therealong to produce usable energy;

(h) a by-pass line connected between said accumulating chamber means and said return chamber means to allow a controlled amount of condensed water to flow from said accumulating chamber means to said return chamber means without passing adjacent said fluid-driven turbine means;

(i) a second valve means positioned within said by-pass line to modulate flow therethrough;

(j) first control means to modulate fluid flow through each of said first valve means;

(k) second control means to modulate flow through said second valve means;

(l) system temperature sensing means and system pressure sensing means for sensing environmental conditions for communication of the sensed information to said first control means and said second control means; and (m) a water drain positioned adjacent said fluid-driven turbine means to receive potable condensed water from said accumulating chamber means.

* * * * *